United States Patent
Khosrowpour et al.

(10) Patent No.: US 9,792,217 B2
(45) Date of Patent: Oct. 17, 2017

(54) METHODS AND SYSTEMS FOR NORMALIZING A READ-WRITE CACHE ALLOCATION POOL FOR VIRTUAL DESKTOP INFRASTRUCTURE WORKLOADS

(71) Applicant: Dell Products L.P., Round Rock, TX (US)

(72) Inventors: Farzad Khosrowpour, Pflugerville, TX (US); Steven Hunt, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 15/007,992

(22) Filed: Jan. 27, 2016

(65) Prior Publication Data

US 2017/0212842 A1    Jul. 27, 2017

(51) Int. Cl.
G06F 12/00    (2006.01)
G06F 12/0893    (2016.01)
G06F 12/0813    (2016.01)
G06F 12/0804    (2016.01)
G06F 12/0866    (2016.01)

(52) U.S. Cl.
CPC ...... *G06F 12/0893* (2013.01); *G06F 12/0804* (2013.01); *G06F 12/0813* (2013.01); *G06F 12/0866* (2013.01); *G06F 2212/154* (2013.01); *G06F 2212/604* (2013.01); *G06F 2212/62* (2013.01)

(58) Field of Classification Search
None
See application file for complete search history.

(56) References Cited

U.S. PATENT DOCUMENTS

| | | | |
|---|---|---|---|
| 2016/0112341 A1* | 4/2016 | Lui | H04L 67/10 709/226 |
| 2016/0127184 A1* | 5/2016 | Bursell | G06F 15/177 709/221 |
| 2017/0126528 A1* | 5/2017 | Padmanabhan | H04L 43/0876 |

\* cited by examiner

*Primary Examiner* — Brian Peugh
(74) *Attorney, Agent, or Firm* — Baker Botts L.L.P.

(57) ABSTRACT

Methods and systems for normalizing a read-write cache allocation pool for virtual desktop infrastructure (VDI) workloads are disclosed. The method includes determining a cache allocation policy; determining a range of expected input/output (I/O) levels of a storage system; determining a current I/O level of the storage system; determining a target cache allocation based on the cache allocation policy, the range of expected I/O levels, and the current I/O level, the target cache allocation including a first memory region allocated to read cache operations and a second memory region allocated to write cache operations; and reallocating cache memory based on the target cache allocation.

20 Claims, 4 Drawing Sheets

METHODS AND SYSTEMS FOR NORMALIZING A READ-WRITE CACHE ALLOCATION POOL FOR VIRTUAL DESKTOP INFRASTRUCTURE WORKLOADS

TECHNICAL FIELD

This disclosure relates generally to information handling systems and more particularly to methods and systems for normalizing a read-write cache allocation pool for virtual desktop infrastructure (VDI) workloads.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In accordance with some embodiments of the present disclosure, a method for normalizing a read-write cache allocation pool for VDI workloads includes determining a cache allocation policy; determining a range of expected input/output (I/O) levels of a storage system; determining a current I/O level of the storage system; determining a target cache allocation based on the cache allocation policy, the range of expected I/O levels, and the current I/O level, the target cache allocation including a first memory region allocated to read cache operations and a second memory region allocated to write cache operations; and reallocating cache memory based on the target cache allocation.

In accordance with some embodiments of the present disclosure, a non-transitory computer readable medium includes computer readable instructions which, when executed, cause a processor to determine a cache allocation policy; determine a range of expected input/output (I/O) levels of a storage system; determine a current I/O level of the storage system; determine a target cache allocation based on the cache allocation policy, the range of expected I/O levels, and the current I/O level, the target cache allocation including a first memory region allocated to read cache operations and a second memory region allocated to write cache operations; and reallocate cache memory based on the target cache allocation.

In accordance with some embodiments of the present disclosure, an information handling system includes a processor, a memory communicatively coupled to the processor, and a cache manager. The cache manager includes computer readable instructions which, when executed, cause the processor to determine a cache allocation policy; determine a range of expected input/output (I/O) levels of a storage system; determine a current I/O level of the storage system; determine a target cache allocation based on the cache allocation policy, the range of expected I/O levels, and the current I/O level, the target cache allocation including a first memory region allocated to read cache operations and a second memory region allocated to write cache operations; and reallocate cache memory based on the target cache allocation.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment, or other purposes. For example, an information handling system may be a personal computer (e.g., desktop or laptop), tablet computer, mobile device (e.g., personal digital assistant (PDA) or smart phone), server (e.g., blade server or rack server), a consumer electronic device, a network storage device, or another suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more storage devices, one or more communications ports (e.g., network ports) for communicating with external devices as well as various input and output (I/O) devices, such as a keyboard, a mouse, a touchscreen and/or a video display. The information handling system may also include one or more buses operable to transmit communication between the various hardware components.

For the purposes of this disclosure, a computer-readable non-transitory storage medium or media may include, without limitation, one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

As will be described in further detail, the inventors of the present disclosure have discovered methods and systems for normalizing a read-write cache allocation pool for VDI workloads. In a virtual desktop infrastructure (VDI) system, a desktop operating system is hosted within a virtual machine (VM) running on a centralized server. The centralized VM runs a windowing system, such as Microsoft Windows, and executes application software on behalf of a remote user. The remote user interacts with the applications and the windowing system using client software running on a device local to the user.

In a VDI system, multiple VMs may be run on a single centralized server. In such systems, the centralized server may include a hypervisor, which is a hardware and/or software component and creates, runs, and manages VMs on the server. In addition, the centralized server may have a storage system such as a redundant array of inexpensive disks (RAID) system, a set of SSDs, or other suitable storage. The storage system may be shared between VMs and/or users supported by the centralized server. In some VDI systems, the storage system may be shared by multiple servers.

To improve performance of the VDI system, the centralized server typically includes a cache component that buffers in a fast memory, such as RAM, data read from and/or written to the storage system. In such systems, the cache component typically is designed to address high levels of write activity, or high levels of read activity, both not both. Because the input/output (I/O) activity of a given system is generally unpredictable, systems designed to address high levels of both input and output (I/O) often allocate significant memory resources to each, resulting in underutilization of the cache memory. Such allocations may also reduce the number of VMs that can be hosted on each server (known as the consolidation ratio), thus increasing the cost per user of the VDI system as a whole. Conversely, if insufficient cache memory is allocated to handle the current load, the response time to read and/or write requests may increase, adversely affecting the user experience.

The methods and systems disclosed in the present application dynamically adjust the memory allocation of the read and write portions of a common pool of cache memory. In some embodiments, predictable characteristics of VDI workloads are used to enable effective management of the cache memory allocation. For example, in many VDI systems, the arrival of a large number of users at a particular time of day, for example the beginning of the work day in a particular time zone, causes a large number of VMs to load operating system (O/S) and application files within a short time frame—a situation sometimes referred to as a "boot storm." Other examples of predictable loads may include scheduled anti-virus scans, software or O/S updates, business process timelines such as publishing or software release schedules, and other suitable loads. Some predictable patterns may be known and configured by a system administrator. In addition, by observing and analyzing the I/O activity of individual VMs and the system as a whole, the system may also be able to empirically discover predictable patterns of activity. In some embodiments, a group of users may commonly execute a particular I/O-intensive task at a particular time or day. For example, a group of users associated with an accounting department may commonly request heavy read I/O operations to a financial database during tax season. As another example, a marketing department may request heavy write I/O operations to marketing materials during days leading up to a trade show. By observing and recording such patterns, the system may predict similar I/O utilization on subsequent days. As a result, the system more effectively allocates cache memory resources from a common pool of memory: at times when high read activity is predicted, the system allocates more of the common pool of cache memory to read cache operations, but when high write activity is predicted, the system allocates more of the common pool of cache memory to write cache operations.

Particular embodiments are best understood by reference to FIGS. 1-5 wherein like numbers are used to indicate like and corresponding parts.

Figure 1:
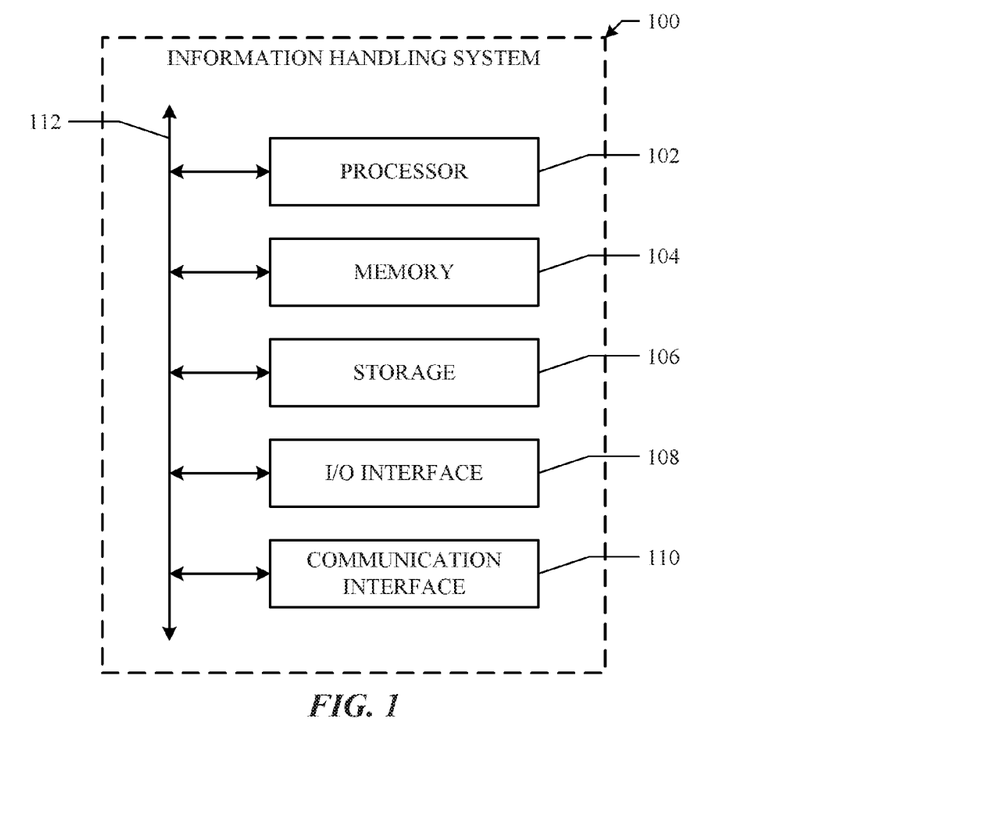
FIG. 1 illustrates a block diagram of selected elements of an embodiment of an information handling system, in accordance with some embodiments of the present disclosure.

FIG. 1 is a block diagram of selected elements of an embodiment of information handling system 100, in accordance with some embodiments of the present disclosure. In particular embodiments, one or more information handling systems 100 perform one or more steps of one or more methods described or illustrated herein. In particular embodiments, one or more information handling systems 100 provide the functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100, be unitary or distributed, span multiple locations, span multiple machines, span multiple data centers, or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes processor 102, memory 104, storage 106, input/output (I/O) interface 108, communication interface 110, and bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate access to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or input/output (I/O) interconnect.

In particular embodiments, information handling system 100 may be a wireless-enabled, portable device that may include one or more processors 102 (e.g., dual core ARM processors), volatile memory 104 (e.g., RAM), non-volatile memory 104 (e.g., flash memory), input/output interfaces 108 (e.g., for display, for data, and for audio), networking/communications interfaces 110, and one or more operating systems (e.g., stored in memory 104 and operated on by processors 102). The input/output interfaces 108 may include display interfaces that support one or more of the Mobile High-Definition Link (MHL) standard, the High Definition Multimedia Interface (HDMI) standard, or the Display Port (DP) standard. The input/output interfaces 108 may also include one or more USB ports (e.g., standard, mini or micro USB), one or more removable memory slots (e.g., SD card slots), and audio capabilities through the MHL, HDMI, or DP interfaces. Information handling system 100 may include networking or communication interfaces 110 that support IEEE 802.11 WLAN protocols (including a, b, g, n, or ac, or further variants such as 801.11h and 802.11f, single or dual band WiFi, BLUETOOTH communication, and near field communication (NFC). Information handling system 100 may include one or more operating systems, including versions of Android, Windows, Wyse ThinOS, Linux, or Apple iOS. Information handling system 100 may include one or more native applications, including, for example, a browser, a media player and recorder, voice over IP and video communication software, and software for remote access to cloud services or other remote content or services.

Figure 2:
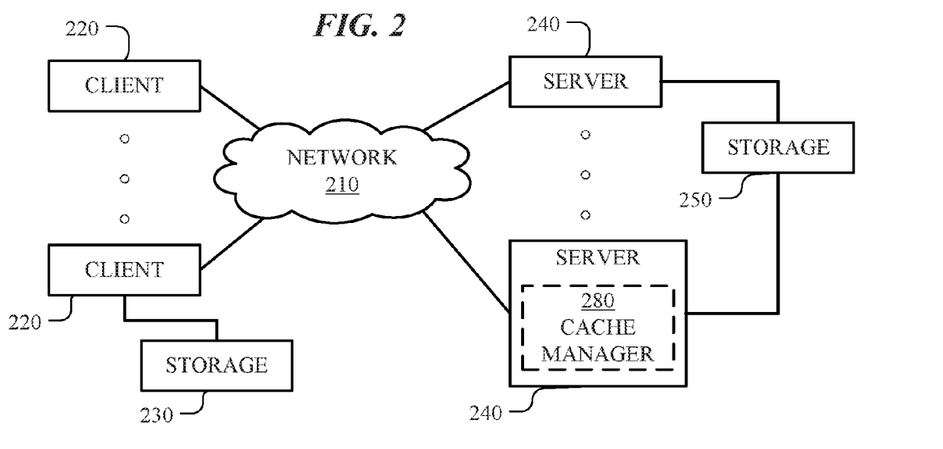
FIG. 2 illustrates an example network environment, in accordance with some embodiments of the present disclosure.

In some embodiments, client devices, as described in more detail with respect to FIG. 2, may be implemented fully or in part by information handling system 100. A user may, for example, use information handling system 100 to interact with the windowing system or applications on a VDI system. In some embodiments, a server device, as described in more detail with respect to FIG. 2, may be implemented fully or in part by information handling system 100.

FIG. 2 illustrates an example network environment 200 in which an information handling system may operate with a VDI server, in accordance with some embodiments of the present disclosure. In particular embodiments, one or more client devices 220 and one or more servers 240 are connected via a network 210. Network 210 may include a public network or a private (for example, corporate) network. Additionally, network 210 may, for example, include a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (for example, a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (for example, customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may implemented fully or in part by the information handling system 100 of FIG. 1, and may include a desktop computer, a blade computer, a laptop computer, a tablet computer, a virtual machine a handheld device, a mobile phone, a kiosk, a vending machine, a billboard, or any suitable information handling system. In particular embodiments, a client device 220 includes an embedded computer and may use flash memory (for example, a solid state drive) for storage instead of a hard disk drive. In particular embodiments, a client device 220 includes a thin client having limited processing capabilities and limited storage. Such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (for example, Microsoft Terminal Server), a published application (for example, Microsoft Terminal Server), or any suitable information handling system. As an example, a private or corporate network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

In particular embodiments, one or more servers 240 of a network 210 may include a cache manager 280. Cache manager 280 may manage one or more storage devices 250. Storage devices 250 may include, for example, RAID arrays or network-attached storage devices. Cache manager 280 may be implemented by a software or hardware component that manages a pool of cache memory, dynamically allocates portions of the pool to read or write cache, and utilizes the cache memory to buffer reads and writes to storage system 250. Although the present disclosure illustrates storage system 250 as shared between multiple servers 240, any suitable configuration of storage devices 250 may be used. For example, storage system 250 may be directly connected to a particular server 240. Cache manager 280 may be implemented by, for example, a script, executable, application, application programming interface, code, functions, or other instructions. The instructions, when read and executed by a processor, may cause cache manager 280 to perform the functionality described in this disclosure.

In particular embodiments, a client device such as client device 220 may be designed with minimal or limited storage capacity (for example, in a hard disk). The client device may be required, however, to run an operating system such as Windows Embedded or Windows Server, but the footprint of such an operating system may grow over time with newer releases or updates. Hence, client devices may, over time, begin to run low on free storage space (for example, in the hard disk). Unwanted files may be deleted or full volume compression of the storage medium (for example, the hard disk) may be implemented to increase available storage space. However, full volume compression may introduce performance shortcomings from the point of view of an end user of the client device. For example, increased number of instruction cycles may be required to compress/uncompress data in the volume. In particular embodiments, optimized volume compression may be implemented to reduce effective disk usage on a client device while minimizing impact on system performance.

In particular embodiments, a thin client, a slim client, or a lean client of client device 220, or one or more software components associated with client device 220, may depend on server 240 to help fulfill some or all of its computational roles. As an example of a Virtual Desktop Infrastructure (VDI) and not by way of limitation, client device 220 may provide one or more terminal services to one or more users of client device 220. As such, the users of multiple instances of client device 220 may login to the same server 240 and perform tasks on the same server 240 substantially at the same time. In the VDI, one or more local storage devices 230 may be connected to client device 220. In particular embodiments, in order for the local storage devices 230 to work seamlessly, communications associated with the local storage devices 230 may be redirected to a Virtual Desktop (VD) operating system (OS) or a Virtual Machine (VM) OS (for example, WINDOWS SERVER 2003) of the VDI. As a result, cache manager 280 may also use its pool of cache memory to buffer reads and writes to local storage devices 230.

Figure 3A:
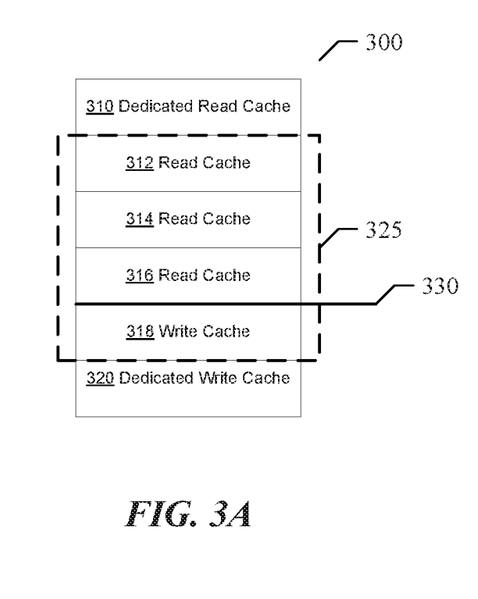
FIGS. 3A and 3B illustrate an example cache allocation pool, in accordance with some embodiments of the present disclosure.
Figure 3B:
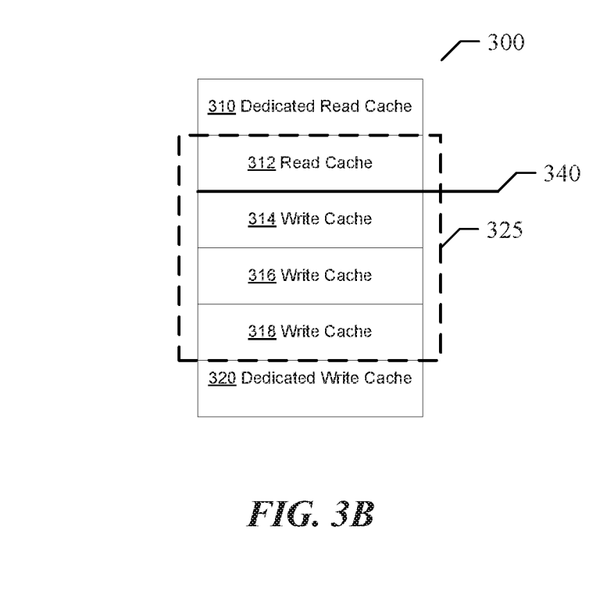

FIGS. 3A and 3B illustrate an example cache allocation pool 300, in accordance with some embodiments of the present disclosure. In FIGS. 3A and 3B, cache allocation pool 300 includes memory regions 310, 312, 314, 316, 318, and 320. In one embodiments, memory region 310 includes a dedicated read cache region, which is persistently used to buffer data read from storage system 250. In some embodiments, memory region 320 includes a dedicated write cache region, which is persistently used to buffer data to be written to storage system 250. Memory regions 312, 314, 316, and 318 may be allocated to read cache operations or write cache operations depending upon the dynamic configuration of cache allocation pool 300. Thus, memory regions 312, 314, 316, and 318 may be collectively referred to as allocatable pool 325. Although the present disclosure illustrates a cache allocation pool with a specific number and size of memory regions, a cache allocation pool may include any suitable number and/or size of memory regions. In addition, any suitable number or size of memory regions may be included in the dedicated read cache region, the dedicated write cache region, and/or the allocatable pool. Furthermore, memory regions included in a cache allocation pool may be located contiguously or non-contiguously within a single memory or may be located in multiple memories.

In some embodiments, cache manager 280 may adjust the allocation of allocatable pool 325. For example, cache manager 280 may allocate more of allocatable pool 325 to read cache operations at times when high read activity is predicted, as discussed in connection with FIG. 3A below. As another example, cache manager 280 may allocate more of allocatable pool 325 to write cache operations at times when high write activity is predicted, as discussed in connection with FIG. 3B below.

FIG. 3A illustrates cache allocation pool 300 configured for a high level of read activity. For example, FIG. 3A may illustrate the configuration of cache allocation pool 300 during a "boot storm" or anti-virus scan, as discussed above.

As a result, cache manager 280 may set the boundary point between read and write cache such that the majority of allocatable pool 325 is assigned to read cache operations. For example, cache manager 280 may set the boundary point between read cache and write cache to position 330, located between memory regions 316 and 318. As a result, memory regions 312, 314, and 316 may be used for read cache operations (along with dedicated read cache region 310), and memory region 318 may be used for write cache operations (along with dedicated write cache region 320). Although the present disclosure illustrates a specific allocation of memory regions, a cache allocation pool may allocate any suitable number and/or size of memory regions to read cache operations and write cache operations.

FIG. 3B illustrates cache allocation pool 300 configured for a high level of write activity. For example, FIG. 3B may illustrate the configuration of cache allocation pool 300 during a software or operating system update, as discussed above. As a result, cache manager 280 may set the boundary point between read and write cache such that the majority of allocatable pool 325 is assigned to write cache operations. For example, cache manager 280 may set the boundary point between read cache and write cache to position 340, located between memory regions 312 and 314. As a result, memory region 312 may be used for read cache operations (along with dedicated read cache region 310), and memory regions 314, 316, and 318 may be used for write cache operations (along with dedicated write cache region 320). Although the present disclosure illustrates a specific allocation of memory regions, a cache allocation pool may allocate any suitable number and/or size of memory regions to read cache operations and write cache operations.

Figure 4:
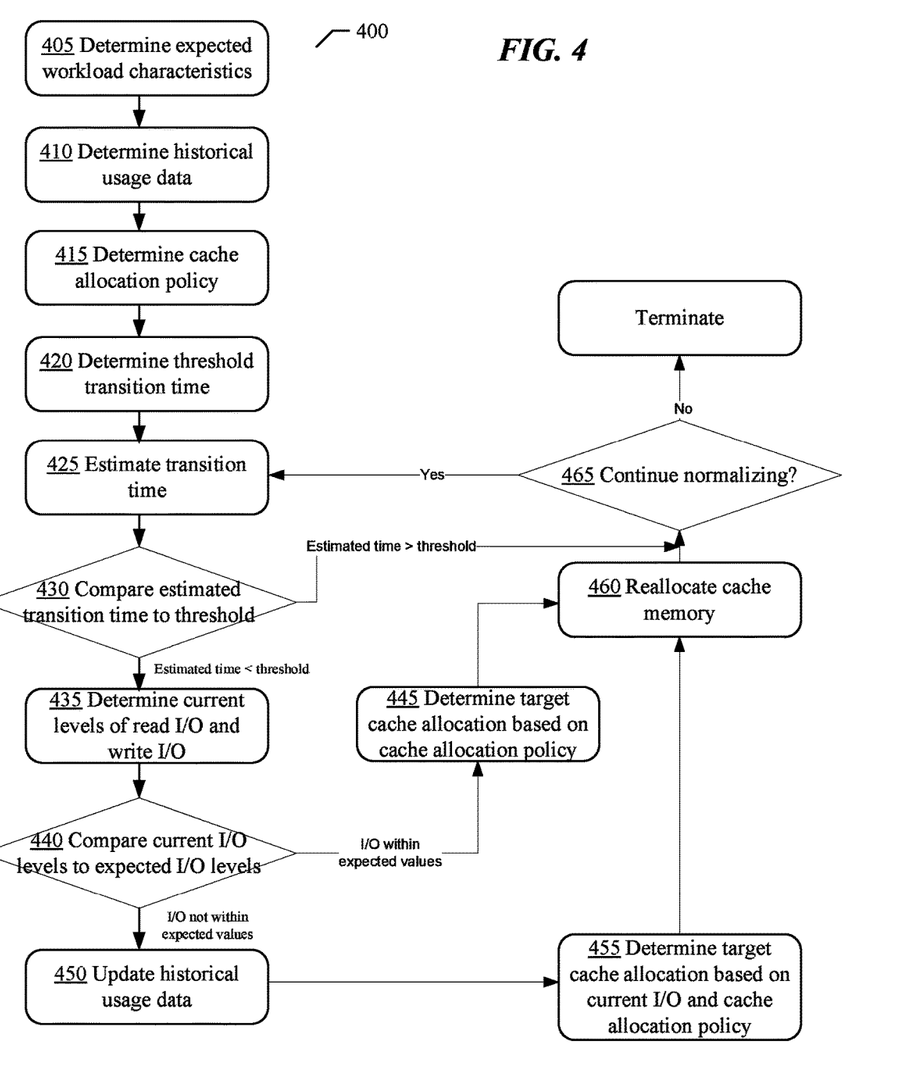
FIG. 4 illustrates an example method for normalizing a read-write cache allocation pool for VDI workloads, in accordance with some embodiments of the present disclosure.

FIG. 4 illustrates an example method 400 for normalizing a read-write cache allocation pool for VDI workloads, in accordance with some embodiments of the present disclosure. The steps of method 400 may be performed by various computer programs, models or any combination thereof. The programs and models may include instructions stored on a computer-readable medium and operable to perform, when executed, one or more of the steps described below. The computer-readable medium may include any system, apparatus or device configured to store and/or retrieve programs or instructions such as a microprocessor, a memory, a disk controller, a compact disc, flash memory, or any other suitable device. The programs and models may be configured to direct a processor or other suitable unit to retrieve and/or execute the instructions from the computer readable media. For example, method 400 may be executed by processor 102, server 240, cache manager 280, and/or other suitable source. For illustrative purposes, method 400 is described with respect to cache manager 280 and storage system 250 of FIG. 2; however, method 400 may be used for control of any suitable cache and/or storage system.

Method 400 may begin at step 405, in which the cache manager may determine a set of expected workload characteristics. For example, in some embodiments, an operator may determine that a boot storm is likely on weekdays between 8:00 and 9:00 am. Consequently, the operator may configure the cache manager to expect a large number of read I/O operations during those hours. In some embodiments, an operator may determine that a software update to a number of VMs is scheduled for 1:00 to 2:00 am on a particular calendar date, for example a Saturday. Consequently, the operator may configure the cache manager to expect a large number of write I/O operations during that time span. Although this disclosure discusses particular expected workload characteristics, any suitable workload characteristics may be used.

In step 410, the cache manager may determine a set of historical usage data. In some embodiments, historical usage data may reflect the usage of the storage system as a whole. For example, the cache manager may store the numbers or sizes of read I/O and write I/O usage as a function of the time of day, the day of the week, the day of the month, or other suitable characteristics. In some embodiments, historical usage data may reflect the usage of the storage system by particular users or groups of users. For example, the cache manager may store the numbers or sizes of read I/O and write I/O usage for each user as a function of the time of day, the day of the week, the day of the month, or other suitable characteristics. Such records may contain patterns of predictable usage. For example, in some embodiments, a group of users associated with an accounting department may commonly request heavy read I/O operations to a financial database during tax season. As another example, a marketing department may request heavy write I/O operations to marketing materials during days leading up to a trade show In step 415, the cache manager may determine a cache allocation policy. In some embodiments, the cache allocation policy may include particular cache allocations corresponding to particular expected workload characteristics. For example, a system administrator may configure the cache manager to allocate 80% of cache memory to read I/O during an expected boot storm. As another example, the system administrator may configure the cache manager to allocate 75% of cache memory to write I/O during a time period when a software update is scheduled. In some embodiments, the cache allocation policy may include relative priorities of particular I/O tasks. For example, in some embodiments, write I/O operations to a financial database may be given higher priority than read I/O operations to ensure that subscribers to the database will have access to up-to-date information in real time or near real time. This priority scheme may result in a cache allocation policy that dedicates an increased percentage of cache memory for write operations. In some embodiments, users of the VDI system may be organized into groups, with some groups given higher priorities than others. For example, during tax season, read I/O requests from users in an accounting department may be given higher priority than write requests from users in a marketing department. This priority scheme may result in a cache allocation policy that dedicates an increased percentage of cache memory for read operations. Although this disclosure discusses particular cache allocation policies, any suitable cache allocation policies may be used.

In step 420, the cache manager may determine a threshold transition time for reallocation of the cache pool. The threshold time may represent a time maximum acceptable time to adjust the allocation of the cache pool. For example, in some circumstances, reallocation of the cache pool may be prevented or delayed if the reallocation process would produce unacceptably long response times to user I/O requests. In some embodiments, the threshold transition time may be based on a target response time to the user of the VDI system. For example, a system administrator may determine that a response time to a user read I/O request of 100 milliseconds (ms) produces an acceptable user experience for a user of the VDI system. In such an embodiment, the cache manager may determine that performing a read I/O request, at current workload and cache levels, requires 40 ms. As a result, the cache manager may determine a threshold transition time of 60 ms allows reallocation of the cache pool without degrading the desired user experience. In some embodiments, a system administrator may configure the threshold transition time. In some embodiments, the cache manager may calculate the threshold transition time based on the current response time of the VDI system to user input. For example, if the VDI system is heavily loaded, such that the response time to the user is high, the cache manager may select a higher threshold transition time than if the VDI system is lightly loaded, such that the response time to the user is low.

In step 425, the cache manager may estimate a transition time for reallocation of the cache pool. For example, the cache manager may estimate the amount of time required to perform steps 430 to 460 of method 400, in the event that a new cache allocation is selected. In some embodiments, the cache manager may estimate the transition time based on the current workload on server 240, the available memory resources in server 240, the available processing resources in server 240, available bandwidth to storage system 250, or other appropriate factors.

In step 430, the cache manager may compare the transition time estimated in step 425 to the threshold transition time determined in step 420. If the estimated transition time is greater than the threshold transition time, method 400 may proceed to step 465, thereby preventing any change to the allocation of the cache pool. If the estimated transition time is not greater than the threshold transition time, method 400 may proceed to step 435.

In step 435, the cache manager may determine the current levels of read I/O and write I/O. In some embodiments, the cache manager may determine the total number of read I/O operations and write I/O operations that were requested within a certain time interval. For example, during a boot storm, the cache manager may determine that two thousand read operations and one hundred write operations were requested within a span of 10 ms. In some embodiments, the cache manager may determine the total size of read I/O operations and write I/O operations that occurred within a certain time interval. For example, the cache manager may determine that two hundred megabytes (200 MB) of read I/O and 10 MB of write I/O were requested within a span of 10 ms. Although this disclosure discusses particular numbers and/or amounts of read I/O and write I/O, any suitable numbers may occur in operation. In addition, the cache manager may update the historical usage data using the current levels of read I/O and write I/O, for later comparison.

In step 440, the cache manager may compare the levels of read I/O and write I/O to expected values based on the expected workload characteristics and the historical usage data. In some embodiments, the cache manager may compare the levels of read I/O and write I/O to previously stored values. For example, during a boot storm, the cache manager may determine that read I/O requests have increased from 10 MB per 10 ms to 200 megabytes per 10 ms, as expected. As another example, during a software update, the cache manager may determine that write I/O requests have increased from 10 MB per 10 ms to 300 MB per 10 ms, as expected. As yet another example, the cache manager may determine that read I/O requests have unexpectedly increased from 10 MB per 10 ms to 400 megabytes per 10 ms, such that read I/O represents an unexpectedly large fraction of total requested I/O. If the levels of read I/O and write I/O fall within expected values, method 400 may proceed to step 445. If the levels of read I/O and write I/O do not fall within expected values based on the cache allocation policy, method 400 may proceed to step 450.

In step 445, the cache manager may determine a target cache allocation based on the cache allocation policy. For example, the cache manager may allocate 80% of cache memory to read I/O during an expected boot storm, as discussed above in connection with step 415. As another example, the cache manager may allocate 75% of cache memory to write I/O during a time period when a software update is scheduled. Although the present disclosure illustrates a specific target cache allocation, any suitable target cache allocation may be used. The cache manager may then proceed to step 460.

In step 450, the cache manager may update the historical usage data based on the current levels of read I/O and write I/O. For example, if the cache manager determined in step 440 that read I/O requests have unexpectedly increased, the cache manager may record this unexpected usage. In some embodiments, the cache manager may detect patterns of unexpected usage. For example, if read I/O requests are unexpectedly high during particular working hours for three consecutive days, the cache manager may detect this sustained pattern of read activity. In some embodiments, the cache manager may alert a system administrator to such a pattern. In some embodiments, the cache manager may update the expected levels of I/O activity in response to detecting such a pattern of unexpected activity.

In step 455, the cache manager may determine a target cache allocation based on the current levels of read I/O and write I/O and the cache allocation policy. In some embodiments, the cache allocation policy may constrain the cache allocation. For example, the cache allocation policy may require allocation of 80% of cache memory to read I/O during an expected boot storm, regardless of current I/O levels. In some embodiments, unexpected levels of I/O activity will result in alterations to the cache allocation. For example, if the cache manager detects an unexpectedly high level of write I/O activity (at a time that is not constrained by a cache allocation policy), the cache manager may increase the amount of cache memory allocated to write I/O. For example, the cache manager may move the boundary point between read and write cache from position 330, as illustrated in FIG. 3A, to position 340, as illustrated in FIG. 3B. Although the present disclosure illustrates a specific target cache allocation, any suitable target cache allocation may be used.

In step 460, the cache manager may reallocate cache memory based on the new cache allocation, as described in further detail with reference to FIG. 5 below.

In step 465, the cache manager may determine whether to continue normalizing the read-write cache allocation pool. For example, in some embodiments an override flag may be set to cause method 400 to terminate. As another example, a system administrator may configure the cache manager to execute method 400 only during particular times of day, days of the week, days of the month, or other suitable time periods. If the cache manager determines that it should continue normalizing the read-write cache allocation pool, method 400 may then return to step 425. If the cache manager determines that it should not continue normalizing the read-write cache allocation pool, method 400 may terminate.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for normalizing a read-write cache allocation pool for VDI workloads, including the particular steps of the method of FIG. 4, this disclosure contemplates any suitable method for normalizing a read-write cache allocation pool for VDI workloads including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4. For example, some steps of FIG. 4 may be performed by cache manager 280, discussed with reference to FIG. 2, while other steps of FIG. 4 are performed by storage system 250.

Figure 5:
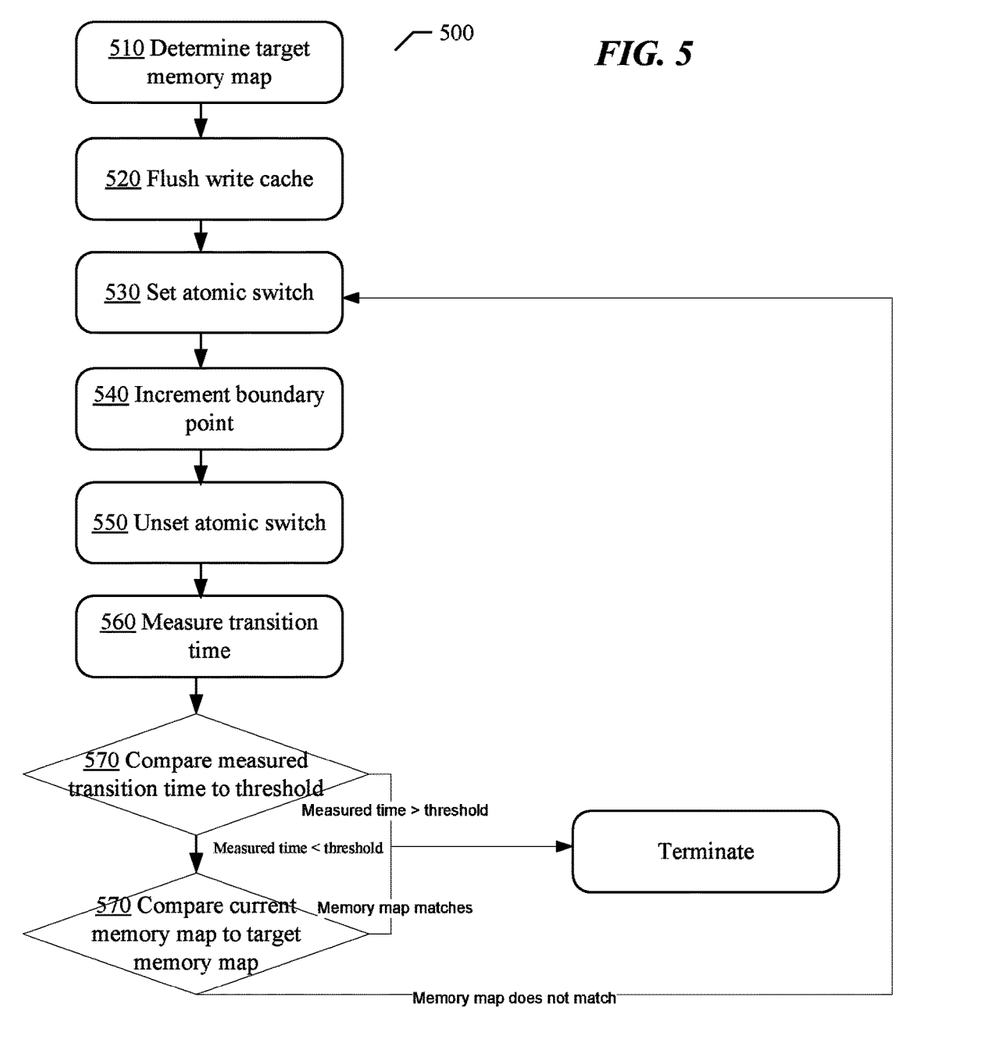
FIG. 5 illustrates an example method for reallocating a read-write cache allocation pool for VDI workloads, in accordance with some embodiments of the present disclosure.

FIG. 5 illustrates an example method 500 for reallocating a read-write cache allocation pool for VDI workloads, in accordance with some embodiments of the present disclosure. For example, method 500 may be used to implement step 460 of method 400, described above in connection with FIG. 4. The steps of method 500 may be performed by various computer programs, models or any combination thereof. The programs and models may include instructions stored on a computer-readable medium and operable to perform, when executed, one or more of the steps described below. The computer-readable medium may include any system, apparatus or device configured to store and/or retrieve programs or instructions such as a microprocessor, a memory, a disk controller, a compact disc, flash memory, or any other suitable device. The programs and models may be configured to direct a processor or other suitable unit to retrieve and/or execute the instructions from the computer readable media. For example, method 500 may be executed by processor 102, server 240, cache manager 280, a user, and/or other suitable source. For illustrative purposes, method 500 is described with respect to cache manager 280 and storage system 250 of FIG. 2; however, method 500 may be used for control of any suitable cache and/or storage system.

Method 500 may begin at step 510, in which the cache manager may determine a target memory map for the updated cache pool. For example, in some embodiments, cache pool 325 may be largely allocated to write I/O as illustrated in FIG. 3B. In such an embodiment, the cache manager may determine that a larger portion of cache pool 325 should be allocated to read cache operations. For example, during a boot storm, the cache manager may determine that the boundary point between read cache and write cache should instead be located at position 330, as illustrated in FIG. 3A. As a result, memory regions 316 and 314, discussed with reference to FIGS. 3A and 3B, may be reallocated from write cache operations to read cache operations in the target memory map.

In step 520, the cache manager may flush portions of the write cache. For example, the cache manager may cause any cached writes in memory regions 314 and 316 to be written to disk. As a result, the memory in regions 314 and 316 can be safely reused without loss of data.

In step 530, the cache manager may set an atomic switch. An atomic switch prevents one thread of execution in a processor from reading data while a second thread of execution is making changes to the data. For example, the cache manager may include a read-write semaphore or other appropriate atomic data structure to control access to the configuration of the cache pool. By setting the switch, the cache manager may prevent other processes, for example the I/O systems of VMs operating on server 240, from accessing the memory in cache 300, discussed with reference to FIGS. 3A and 3B, while the cache manager adjusts the allocation of memory regions in cache 300. For example, an I/O system of a VM running on server 240 and attempting to write to storage system 250 may be temporarily halted while the cache manager executes steps 540-550 below.

In step 540, the cache manager may adjust the sizes of the memory regions allocated to read cache operations and to write cache operations. In some embodiments, the cache manager may move the boundary point between read and write cache. For example, the cache manager may move the boundary point from position 340, illustrated in FIG. 3B, to the point between memory regions 314 and 316. As another example, in a subsequent iteration, the cache manager may move the boundary point from the point between memory regions 314 and 316 to position 330, illustrated in FIG. 3A.

In step 550, the cache manager may unset the atomic switch. As a result, the cache manager may permit other processes, for example the I/O systems of VMs operating on server 240, to access the memory in cache 300, discussed with reference to FIGS. 3A and 3B. In some embodiments, processes halted in step 530 above may resume operation once the atomic switch is unset.

In step 560, the cache manager may measure the transition time required to increment the boundary point. For example, the cache manager may sample the current system clock when the atomic switch was set in step 530 and when the atomic switch was unset in step 550, and compute the difference in time between the clock samples.

In step 570, the cache manager may compare the measured transition time to a threshold transition time. For example, the cache manager may compare the measured transition response time to the threshold determined in step 420 of method 400. If the measured transition time was greater than the threshold, method 500 may terminate. If the measured transition time was not greater than the threshold, method 500 may proceed to step 580

In step 580, the cache manager may compare the current memory map for the cache pool to the target memory map. If the current memory map matches the target memory map, method 500 may terminate. If the current memory map does not match the target memory map, method 500 may return to step 530 to further adjust the sizes of the memory regions allocated to read cache operations and to write cache operations.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for reallocating a read-write cache allocation pool for VDI workloads, including the particular steps of the method of FIG. 5, this disclosure contemplates any suitable method for reallocating a read-write cache allocation pool for VDI workloads including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5. For example, some steps of FIG. 5 may be performed by cache manager 280, discussed with reference to FIG. 2, while other steps of FIG. 5 are performed by storage system 250.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for normalizing a read-write cache allocation pool for VDI workloads, comprising:
   determining a cache allocation policy;
   determining a range of expected input/output (I/O) levels of a storage system;
   determining a current I/O level of the storage system;
   determining a target cache allocation based on the cache allocation policy, the range of expected I/O levels, and the current I/O level, the target cache allocation including a first memory region allocated to read cache operations and a second memory region allocated to write cache operations; and
   reallocating cache memory based on the target cache allocation.

2. The method of claim 1, further comprising determining historical usage data, wherein the target cache allocation is further based on the historical usage data.

3. The method of claim 2, further comprising updating the historical usage data based on the current I/O level.

4. The method of claim 1, further comprising determining expected workload characteristics, wherein the target cache allocation is further based on the expected workload characteristics.

5. The method of claim 1, further comprising:
   determining a threshold transition time;
   estimating an estimated transition time; and
   comparing the estimated transition time to the threshold transition time;
   wherein determining the target cache allocation comprises preventing a change to the cache allocation based on a determination that the estimated transition time is greater than the threshold transition time.

6. The method of claim 1, wherein determining the target cache allocation comprises:
   comparing the current I/O level to the range of expected I/O levels;
   determining the target cache allocation based on the cache allocation policy based on a determination that the current I/O level falls within the range of expected I/O levels; and
   determining the target cache allocation based on the cache allocation policy and the current I/O level based on a determination that the current I/O level does not fall within the range of expected I/O levels.

7. The method of claim 1, wherein reallocating cache memory comprises:
   flushing a portion of the second memory region;
   setting an atomic switch;
   adjusting the size of the second memory region; and
   unsetting the atomic switch.

8. A non-transitory computer readable medium, comprising computer readable instructions which, when executed, cause a processor to:
   determine a cache allocation policy;
   determine a range of expected input/output (I/O) levels of a storage system;
   determine a current I/O level of the storage system;
   determine a target cache allocation based on the cache allocation policy, the range of expected I/O levels, and the current I/O level, the target cache allocation including a first memory region allocated to read cache operations and a second memory region allocated to write cache operations; and
   reallocate cache memory based on the target cache allocation.

9. The non-transitory computer readable medium of claim 8, the instructions, when executed, further causing the processor to determine historical usage data, wherein the target cache allocation is further based on the historical usage data.

10. The non-transitory computer readable medium of claim 8, the instructions, when executed, further causing the processor to update the historical usage data based on the current I/O level.

11. The non-transitory computer readable medium of claim 8, the instructions, when executed, further causing the processor to determine expected workload characteristics, wherein the target cache allocation is further based on the expected workload characteristics.

12. The non-transitory computer readable medium of claim 8, the instructions, when executed, further causing the processor to:
   determine a threshold transition time;
   estimate an estimated transition time; and
   compare the estimated transition time to the threshold transition time;
   wherein determining the target cache allocation comprises preventing a change to the cache allocation based on a determination that the estimated transition time is greater than the threshold transition time.

13. The non-transitory computer readable medium of claim 8, wherein determining the target cache allocation comprises:
   comparing the current I/O level to the range of expected I/O levels;
   determining the target cache allocation based on the cache allocation policy based on a determination that the current I/O level falls within the range of expected I/O levels; and
   determining the target cache allocation based on the cache allocation policy and the current I/O level based on a determination that the current I/O level does not fall within the range of expected I/O levels.

14. The non-transitory computer readable medium of claim 8, wherein reallocating cache memory comprises:
flushing a portion of the second memory region;
setting an atomic switch;
adjusting the size of the second memory region; and
unsetting the atomic switch.

15. An information handling system, comprising:
at least one processor;
a memory communicatively coupled to the at least one processor; and
a cache manager including computer readable instructions in the memory, the instructions, when executed, for causing the processor to:
determine a cache allocation policy;
determine a range of expected input/output (I/O) levels of a storage system;
determine a current I/O level of the storage system;
determine a target cache allocation based on the cache allocation policy, the range of expected I/O levels, and the current I/O level, the target cache allocation including a first memory region allocated to read cache operations and a second memory region allocated to write cache operations; and
reallocate cache memory based on the target cache allocation.

16. The information handling system of claim 15, the instructions, when executed, further causing the processor to determine historical usage data, wherein the target cache allocation is further based on the historical usage data.

17. The information handling system of claim 15, the instructions, when executed, further causing the processor to update the historical usage data based on the current I/O level.

18. The information handling system of claim 15, the instructions, when executed, further causing the processor to determine expected workload characteristics, wherein the target cache allocation is further based on the expected workload characteristics.

19. The information handling system of claim 15, the instructions, when executed, further causing the processor to:
determine a threshold transition time;
estimate an estimated transition time; and
compare the estimated transition time to the threshold transition time;
wherein determining the target cache allocation comprises preventing a change to the cache allocation based on a determination that the estimated transition time is greater than the threshold transition time.

20. The information handling system of claim 15, wherein determining the target cache allocation comprises:
comparing the current I/O level to the range of expected I/O levels;
determining the target cache allocation based on the cache allocation policy based on a determination that the current I/O level falls within the range of expected I/O levels; and
determining the target cache allocation based on the cache allocation policy and the current I/O level based on a determination that the current I/O level does not fall within the range of expected I/O levels.

* * * * *